(12) United States Patent
Warner et al.

(10) Patent No.: US 12,321,397 B2
(45) Date of Patent: Jun. 3, 2025

(54) FRAMEWORK FOR ENHANCEMENT OF CLOUD WORKSPACE METADATA AND MARKING CAPABILITIES

(71) Applicant: Capital One Services, LLC, McLean, VA (US)

(72) Inventors: Paul Warner, Reston, VA (US); Sam Walczak, Columbia, MD (US); Joel Sop, Arlington, VA (US); Julia Pennington, Austin, TX (US); Collin Berman, Bellevue, WA (US); Nikhil Srikanth, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/229,241

(22) Filed: Aug. 2, 2023

(65) Prior Publication Data

US 2025/0045335 A1    Feb. 6, 2025

(51) Int. Cl.
*G06F 16/93*     (2019.01)
*G06F 11/34*     (2006.01)
*G06F 40/20*     (2020.01)

(52) U.S. Cl.
CPC .......... *G06F 16/93* (2019.01); *G06F 11/3476* (2013.01); *G06F 40/20* (2020.01)

(58) Field of Classification Search
CPC ....... G06F 16/93; G06F 11/3476; G06F 40/20
See application file for complete search history.

(56) References Cited

U.S. PATENT DOCUMENTS

| 7,958,147 | B1 | 6/2011 | Turner et al. |
| 2010/0058291 | A1 | 3/2010 | Hahn et al. |
| 2018/0027006 | A1* | 1/2018 | Zimmermann ..... H04L 63/0227 726/11 |
| 2018/0197087 | A1* | 7/2018 | Luo ........................ G06N 20/00 |
| 2019/0268379 | A1* | 8/2019 | Narayanaswamy .... H04L 63/12 |
| 2023/0068342 | A1 | 3/2023 | Matei et al. |
| 2024/0249016 | A1* | 7/2024 | Shashanka .......... G06F 21/6245 |

\* cited by examiner

*Primary Examiner* — Etienne P Leroux
*Assistant Examiner* — Cindy Nguyen (57) ABSTRACT

Methods, computer readable media, and apparatuses are provided herein for enhancement of document metadata processing and marking capability across cloud platforms. A data streaming pipeline may be configured between a cloud document storage platform and a cloud platform. A metadata processing server may detect a document manipulation event associated with a document stored in the cloud document storage platform. The metadata processing server may determine a triggering rule associated with the document corresponding to the document manipulation event, and cause a resultant document action in the cloud document storage platform.

20 Claims, 7 Drawing Sheets

FRAMEWORK FOR ENHANCEMENT OF CLOUD WORKSPACE METADATA AND MARKING CAPABILITIES

FIELD OF USE

Aspects of the disclosure relate generally to data communication between a cloud storage platform and a cloud platform. More specifically, aspects of the disclosure may provide for a method, apparatus, and computer readable media for an enhancement of document metadata processing and marking capability across these platforms.

BACKGROUND

Documents created and stored in a cloud document storage platform may have several types of metadata including default metadata and custom metadata. For example, documents stored in a cloud storage platform are provided with default metadata such as document name, created at time, last modified time, document size, and so on. An enterprise may define custom metadata tailored for its organization to provide insights to the underlying data. A cloud platform may host numerous processes and services that frequently interact with the metadata for the documents stored in the cloud document storage platform. A conventional system might not have the ability to capture the metadata across the platforms in real time to infer subsequent actions, and thereby limit its ability to process the metadata to support data security and integrity, and improve performance.

Aspects described herein may address these and other problems, and generally improve the quality, efficiency, and speed of processing big data across cloud platforms.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein may include features for enhancement in metadata processing and marking capability across platforms. A metadata processing system may configure a data streaming pipeline between a cloud document storage platform and a cloud platform. The cloud document storage platform may be any type of known cloud storage platform including, but not limited to, Microsoft 365® (which includes cloud storage OneDrive®) and Google Workspace® (which includes cloud storage Google Drive®). The cloud platform may include, for example, Amazon Web Services®, Microsoft Azure® and Google Cloud Platform®. The metadata processing system may receive and monitor an audit log associated with a document stored in the cloud document storage platform. The metadata processing system may detect a document manipulation event associated with the document stored in the cloud document storage platform and determine a triggering rule associated with the document using a machine learning model. The document manipulation event may include for example, a change to a label, a title, or content of the document. The document manipulation event may also include certain operations on the document, such as a download, a duplication or a printing of the document. Based on the triggering rule, the metadata processing system may determine whether the document manipulation event triggers a resultant document action associated with the document and cause the resultant document action in the cloud document storage platform via an Application Programming Interface (API).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various implementations, reference is made to the accompanying drawings, which form a part hereof, and in which is shown by way of illustration various implementations in which aspects of the disclosure may be practiced. It is to be understood that other implementations may be utilized and structural and functional modifications may be made without departing from the scope of the present disclosure. Aspects of the disclosure are capable of other implementations and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to enhancement in metadata processing and marking capability across cloud platforms. A metadata processing system may configure a data streaming pipeline between a cloud document storage platform and a cloud platform. The documents and metadata related to the documents may be stored and manipulated in the cloud document storage platform. The cloud platform may provide an environment to run custom codes, build storage resources and computing resources tailored for an organization. The cloud document storage platform may be any type of known cloud storage platform including, but not limited to, Microsoft 365® (which includes cloud storage OneDrive®) and Google Workspace® (which includes cloud storage Google Drive®). The cloud platform may include, for example, Amazon Web Services®, Microsoft Azure® and Google Cloud Platform®. The metadata processing system may monitor an audit log associated with a document stored in the cloud document storage platform. Based on the monitoring of the audit log, the metadata processing system may detect a document manipulation event and determine, using a machine learning model, a triggering rule associated with the document and the document manipulation event. The document manipulation event may include for example, a change to a label, a title, a name or content of the document. The document manipulation event may also include certain operations on the document, such as a download, a duplication or a printing operation on the document. The triggering rule may indicate whether the document manipulation event triggers a resultant document action associated with the document. Accordingly, the metadata processing system may cause the resultant document action in the cloud document storage platform via an Application Programming Interface (API).

The system may train the machine learning model to determine pre-labeled triggering rules based on document training data comprising document names, document creation times, last modified times, document types and prelabeled document manipulation events. The system may provide, as an input to the trained machine learning model, metadata information associated with the document. The system may receive, based on an output from the trained machine learning model, the triggering rule associated with the document. In some examples, the machine learning model may be trained using user training data such as locations of users having been trained, IP addresses, roles and department affiliations of the users in the organization. The system may receive user feedback information indicating whether the triggering rule is valid and re-train the machine learning model based on the user feedback information.

In many aspects, the system may determine a rule identifier associated with the document manipulation event, and retrieve the triggering rule associated with the document manipulation event based on the rule identifier from the cloud document storage platform. The system may detect the document manipulation event by extracting, from the audit log, log entries by using natural language processing (NLP) to parse the log entries to identify key words associated with one or more document manipulation events. The system may train a second machine learning model to identify the document manipulation event based on the key words.

The metadata processing system may differ from conventional data processing systems at least because it captures and processes metadata information via a data streaming pipeline in real time across cloud platforms. The documents and audit logs that capture the relevant metadata information may be stored in a cloud document storage platform. The processes or services hosted in a cloud platform may monitor the audit log for document manipulation events. The present system is significantly more than scanning a log file at predetermined intervals: rather, the present system may use processes and services running in the cloud platform to retrieve and analyze the audit log stored in a cloud document storage platform (different from the cloud platform) in real time. The present system may detect a document manipulation event and use a machine learning model to determine a triggering rule. The present system may cause the resultant document action in the cloud document storage platform via one or more APIs.

Aspects described herein improve the functioning of computers by improving the security, relevancy and performance of computer-implemented metadata sharing processes. The steps described herein recite improvements to computer-implemented metadata processing processes, and in particular improve the security and utility of document manipulation information across cloud platforms. This is a problem specific to computer-implemented data processing processes, and the processes described herein could not be performed in the human mind (and/or, e.g., with pen and paper). For example, as will be described in further detail below, the processes described herein rely on the use of a data streaming pipeline and one or more APIs, data integration processes across cloud platforms, and the use of various machine learning models.

Before discussing these concepts in greater detail, however, several examples of a computing device that may be used in implementing and/or otherwise providing various aspects of the disclosure will first be discussed with respect to FIG. 1.

Figure 1:
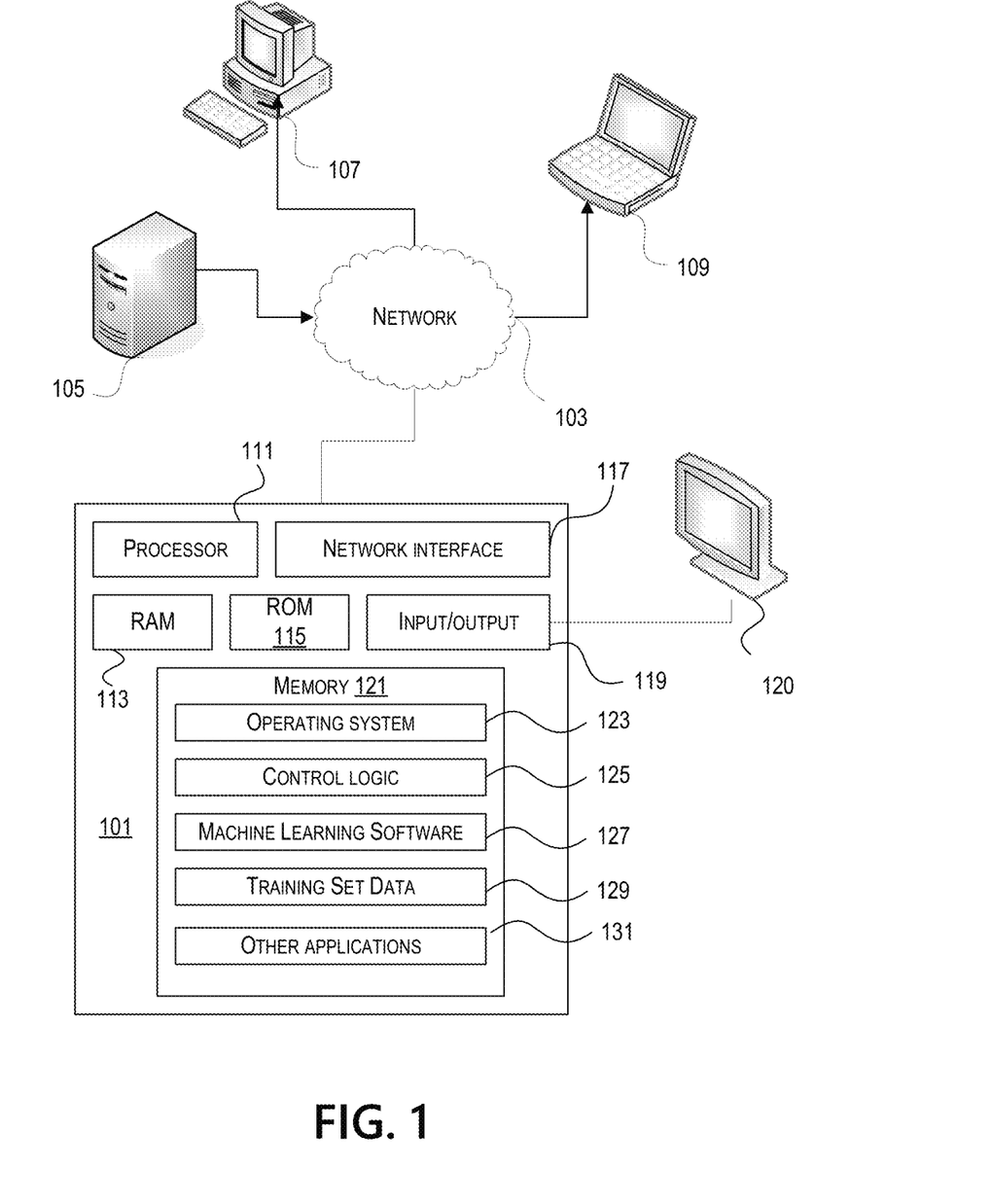
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
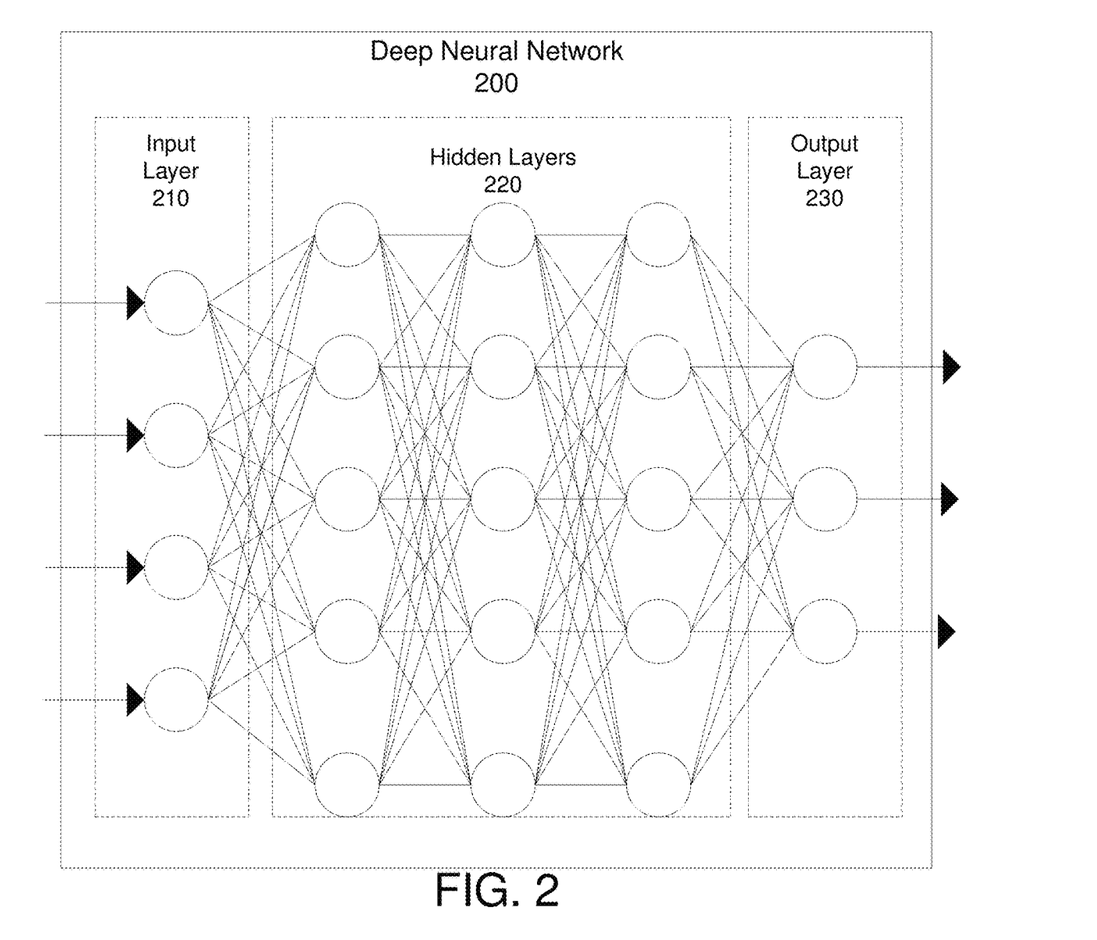
FIG. 2 depicts an example of deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
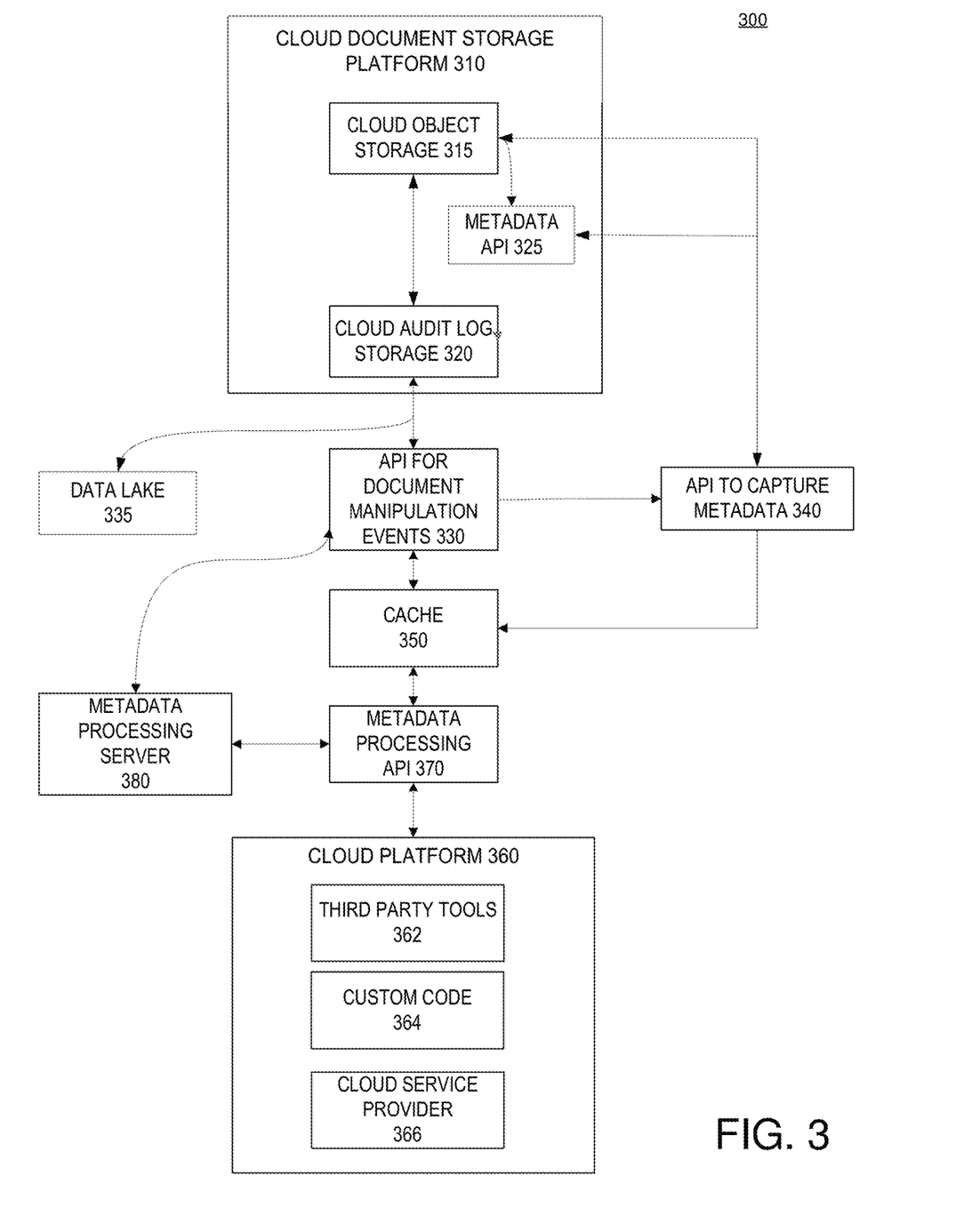
FIG. 3 depicts an example of a system for enhancement in metadata processing and marking capability in which one or more aspects described herein may be implemented.

FIG. 3 an example of a system 300 for enhancement in metadata processing and marking capability in which one or more aspects described herein may be implemented. System 300 includes a cloud storage platform 310, a cloud platform 360, a metadata processing server 380 and various processes executed in an environment (e.g., an enterprise environment) for enhancement in metadata processing and marking capability across platforms. Various portions in FIG. 3 may be performed in the cloud such as by a cloud network which may include distributed storage and computing devices such as remote servers, which may have aspects of computing devices 101 and 105. Other aspects may be performed at an enterprise level within an enterprise network that may include computing devices 101 and 105, and the enterprise's cloud service provider 366 (e.g., Amazon Web Services®, Google Cloud®, etc.) hosted in cloud platform 360.

While the method and techniques disclosed herein apply to various types of objects including, for example, images, video, audio, documents and the like, the following disclosure will discuss a specific example in which the object is a document. Additionally, the cloud document storage platform 310 may be any type of known cloud storage platform including, but not limited to, the current market leaders, Microsoft 365® (which includes cloud storage OneDrive®) and Google Workspace® (which includes cloud storage Google Drive®). For purposes of the disclosure, examples will be provided with Google Workspace (GWS) as the cloud document storage platform, but it will be understood that aspects of the disclosure may be applied to any cloud storage platform.

Many objects are created and stored on a cloud document storage platform. For example, objects (e.g., documents) such as Google Docs® and Google Sheets® can be created and stored in cloud storage such as Google Drive®, all of which may be part of a cloud document storage platform like Google Workspace®. Google Workspace (GWS) is a collection or suite of cloud computing based productivity and collaboration tools including, among others, Google Drive, Google Docs, Google Sheets, custom email addresses, and other administrative tools and advanced functionality.

Certain types of metadata available for objects created in a cloud document storage platform may be default metadata. For example, for a document in GWS, default metadata may include document name, created at time, last modified time and document size. Another type of metadata available for objects stored in cloud storage on a cloud storage platform is custom metadata. For example, for documents in GWS that are stored in Google Drive, the user may define custom metadata using a software tool to create fields and assign values to those fields for each document. For example, a user may create custom metadata using third-party software, using a Google Apps Script® and Google Drive Advanced Service®, or using the Google Drive API.

A cloud platform 360, external to the cloud document storage platform 310, may host a number of processes or services that support running custom codes, building storage resources and computing resources. The cloud platform 360 may provide an environment for implementing functionalities specifically tailored for an organization, which might not be available in the cloud document storage platform. The cloud platform 360 may include, for example, Amazon Web Services®, Microsoft Azure® and Google Cloud Platform®. The metadata processing system 300 described herein may implement a data streaming pipeline across the cloud document storage platform 310 and the cloud platform 360.

In the example of FIG. 3, the cloud document storage platform 310, which may include many elements and APIs, is shown with cloud object storage 315, cloud audit log storage 320, and metadata API 325. In an illustrative implementation of the disclosure, an object may correspond to a document. The document may be created in the cloud storage platform 310 (e.g., GWS) via one of the document creation tools (e.g., Google Docs, Google Sheets, Google Slides, Google Drawings, Google Forms) and hosted or stored in the cloud object storage (e.g., Google Drive) 315. The cloud document storage platform 310 and cloud object storage 315 provide tools for providing custom metadata associated with an object. In GWS, tools (e.g., Data Protection Rules, Drive Labels, and third party tools) may be provided to allow a user to create and associate labels (custom metadata) with documents. In one example, data classification labels, which indicate an access or security level, may be created and applied to a document. GWS allows an enterprise to set up rules for applying labels to documents. For example, if a document contains a specific type of data (e.g., social security number, address, mobile number), a GWS tool can be configured by a user to automatically classify the document with a particular data classification label (e.g., "highly confidential", "confidential". "not confidential", etc.). Once the GWS tool is configured, anytime the label is applied a log entry may be generated. A log entry may also be generated anytime a document manipulation event occurs. The document manipulation event may include for example, a change to a label, a title, a name or content of the document. The document manipulation event may also include certain operations on the document, such as a download, a duplication or a printing operation on the document. The logs are stored in GWS, cloud audit log storage 320, and updated constantly.

The cloud audit log storage 320 may store log entries for API calls or other actions including when a document manipulation event occurs. The cloud document storage platform 310 may allow the audit log to be available to resources outside the cloud document storage platform 310 to be audited by a process. For example, the metadata processing server may utilize an API for document manipulation events 330 (using an audit script) to evaluate the audit logs and intercept document manipulation events from the logs. The API for document manipulation events 330 may parse the document ID (e.g., document name) from the document manipulation event and store the document ID and the document manipulation event in cache 350.

In one example, the metadata processing system may use software tools to stream the audit logs using tools available from their cloud service provider, which may be, for example, Amazon Web Services (AWS), Microsoft Azure, Google Cloud Platform and others. In an illustrative implementation where the cloud data storage platform is GWS, the GWS Admin Audit log via the Google Reports API, is accessible to external API calls. The GWS Admin Audit log provides, for example, a record of activities performed on documents (e.g., Google Doc) stored in Google Drive including when a label, a name or content of the document is changed, or when a document is downloaded, duplicated or printed. In one example, a user may employ an AWS Lambda function to monitor the GWS Admin Audit log for updates. One skilled in the art will appreciate that AWS, a cloud provider frequently used by enterprises, provides AWS Lambda functions. AWS Lambda runs as a serverless cloud function and includes ways of implementing custom code in response to events and automatically managing underlying computing resources. Examples of events include changes in state or an update, which in one aspect of this disclosure may include receiving the audit log and processing the audit log in the AWS environment. AWS Lambda can detect a new or updated audit log. Using further processes and Lambda features in an AWS environment, the AWS Lambda can export the audit log (GWS Admin Audit log) out of GWS via a live stream pipeline (e.g. Kafka, Amazon Kinesis, or the like) which may be or produced or orchestrated by an AWS Lambda function or other infrastructure.

In an illustrative AWS environment, once an AWS Lambda function detects a change in the audit log, the data (audit log) may be pushed to a load balancer. The load balancer may send the data to an AWS Lambda function, which is a log receiver. The log receiver then may forward the data to an AWS SNS (a notification service that pushes data), which pushes the data to a custom AWS SQS (simple queue service) message queue. From the custom SQS queue, the message including the data (audit log) then sends the data to an AWS Lambda function, a streaming function, which streams the data over a stream-processing platform (e.g., Apache Kafka™ streams API) to an enterprise long term data store (e.g., enterprise data lake). In addition, the above functionality described that may be implemented in an AWS environment may also be implemented by software executed locally in the enterprise environment. One of ordinary skill in the art would readily be able to configure software scripts to carry out the functions and processes, which are executed in the AWS environment described.

The API for document manipulation events 330 may intercept the stream intended for data lake 335 and consume the stream, which includes the GWS audit logs. The API for document manipulation events 330 may parse the stream for document manipulation events and cache the document ID in the cache 350. The stream including the GWS audit logs may reach the data lake 335 in parallel with the API for document manipulation events 330.

The API for document manipulation events 330 may forward the document ID and trigger an API to capture metadata 340 (using a metadata enrichment script) to populate the cache 350 with the custom metadata (e.g., classification labels, sensitivity labels, data retention labels (e.g., when or how long a document is to be retained), team labels (e.g., "accounting," "legal," "cyber," etc.)) corresponding to the document. In turn, the API to capture metadata 340 can make additional calls, which include the document ID, to the cloud object storage 315 and a metadata API (e.g., Labels API in the Google Workspace®) 325 to collect the custom metadata (e.g., classification labels) associated with the document. After receiving the custom metadata, the API to capture metadata 340 may update the cache 350 to store the metadata (e.g., classification labels) in association with the document ID. The cache 350 may be provided in the cloud by the enterprise cloud service provider 366, which in one implementation is in AWS. In AWS, the cache 350 may be provided by the AWS DynamoDB, which is a fast, flexible NoSQL database, which includes, among other functions, in-memory caching and data export tools.

The above described process can compile a cache of document manipulation events and/or the custom metadata (e.g., the classification labels) applied to the documents. A metadata processing API 370 may expose the data in the cache 350, the objects related to the document manipulation events, the audit logs and their classifications and other labels, for consumption and use by third party tools 362, custom code 364, cloud service provider 366 and other integrations. Instead of accessing the data directly from cache 350, third party tools 362, custom code 364, cloud service provider 366 and other integrations may access the metadata processing API 370 by making an API function call request to obtain the exposed data.

In one example, the metadata processing API 370 may be implemented by the metadata processing server 380. The metadata processing server 380 may use the API for document manipulation events 330 to monitor the audit log in cache 350 for a document that is stored in the cloud document storage platform. Based on monitoring the audit log, the metadata processing server 380 may detect a document manipulation event associated with the document via the API for document manipulation events 330. For example, the document manipulation event may indicate that a user has changed the content of the document to include confidential information. The metadata processing server 380 may determine a triggering rule associated with the document manipulation event for the documents. Based on the triggering rule, the metadata processing server 380 may determine whether the document manipulation event triggers a resultant document action associated with the document stored in the cloud document storage platform. For example, the triggering rule may indicate that a security classification label associated with the document is to be changed to "highly confidential" corresponding to the document manipulation event. The document with the "highly confidential" label may be prevented from being deleted to comply with the enterprise document retention policy, legal hold requirements, and/or governmental requirements such as defined in the Sarbanes Oxley Act. The document with the "highly confidential" label may be prevented from being sent via email to an external user outside the enterprise. After determining that the document manipulation event triggers the resultant document action, the metadata processing server 380 may cause, via the metadata processing API 370, the resultant document action in the cloud document storage platform. For example, the resultant document action may include updating the security classification label associated with the document to "highly confidential." The updated security classification label may be applied to the document and stored in cloud object storage 315 or in the enterprise environment hosting the metadata processing server 380.

The metadata processing server 380 may use a rule identifier to determine a trigger rule associated with the document manipulation event. The triggering rule may be stored in cloud object storage 315 or in the enterprise environment. Based on the rule identifier and from the cloud document storage platform, the metadata processing server 380 may retrieve the triggering rule associated with the document manipulation event. The metadata processing server 380 may use a machine learning model to determine the triggering rule. The metadata processing server 380 may train the machine learning model to determine pre-labeled triggering rules based on training data comprising document names, document creation times, last modified times, document sizes, and/or document types. The metadata processing server 380 may train the machine learning model using other training data such as locations of users having been trained, IP addresses of the users, roles of the users in an organization and/or department affiliations of the users in the organization.

The metadata processing server 380 may use one or more background processes to cause the resultant document action to occur without the user's knowledge. For example, the user may change the content of the document, and the background processes may detect that the change introduces confidential information. The background processes may automatically update the security classification label associated with the document to "highly confidential" and enforce logics, for example, that would prevent the document to be deleted. Such operations may be hidden from the user without further user interaction. In another example, when any user in the enterprise attempts to send this document via email to a party outside the enterprise, the metadata processing server 380 may cause a message to be displayed on a user interface indicating that the document cannot be sent due to its confidentiality.

Cloud document storage platform 310, cloud platform 360, cloud service provider 366 and/or metadata processing server 380, may be associated with a particular authentication session. Metadata processing server 380 may receive metadata information and audit logs, process and/or share metadata information, document manipulation information or resultant document action information as described herein. However, it should be noted that any device in the metadata processing system 300 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 360 may include a local area network (LAN), a wide area network (WAN), a wireless telecommunications network, and/or any other communication network or combination thereof.

The data transferred to and from various computing devices in metadata processing system 300 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption such as, but not limited to, File Transfer Protocol (FTP), Secure File Transfer Protocol (SFTP), and/or Pretty Good Privacy (PGP) encryption may be used in file transfers to protect the integrity of the data. In many embodiments, one or more web services may be implemented within the various computing devices. Web services may be accessed by authorized external devices and users to support input, extraction, and manipulation of data between the various computing devices in the metadata processing system 300. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the metadata processing system 300 in front of one or more computing devices such that any external devices may communicate directly with the specialized hardware.

The metadata processing system may retrieve and monitor audit logs across platforms in real time to identify document manipulation events. The enterprise may define triggering rules to implement data security, data integrity and compliance logics specifically tailored to the organization. Rather than keeping a simple mapping between a document manipulation event and a resultant document action, the metadata processing system may use a machine learning model to identify the appropriate resultant action (e.g., enhanced marking capabilities) in response to the document manipulation event and in view of embedded document metadata, user information and context information related to the document manipulation event. The metadata processing system may employ background processes to enforce data security, data integrity and compliance logics behind the scene.

Figure 4:
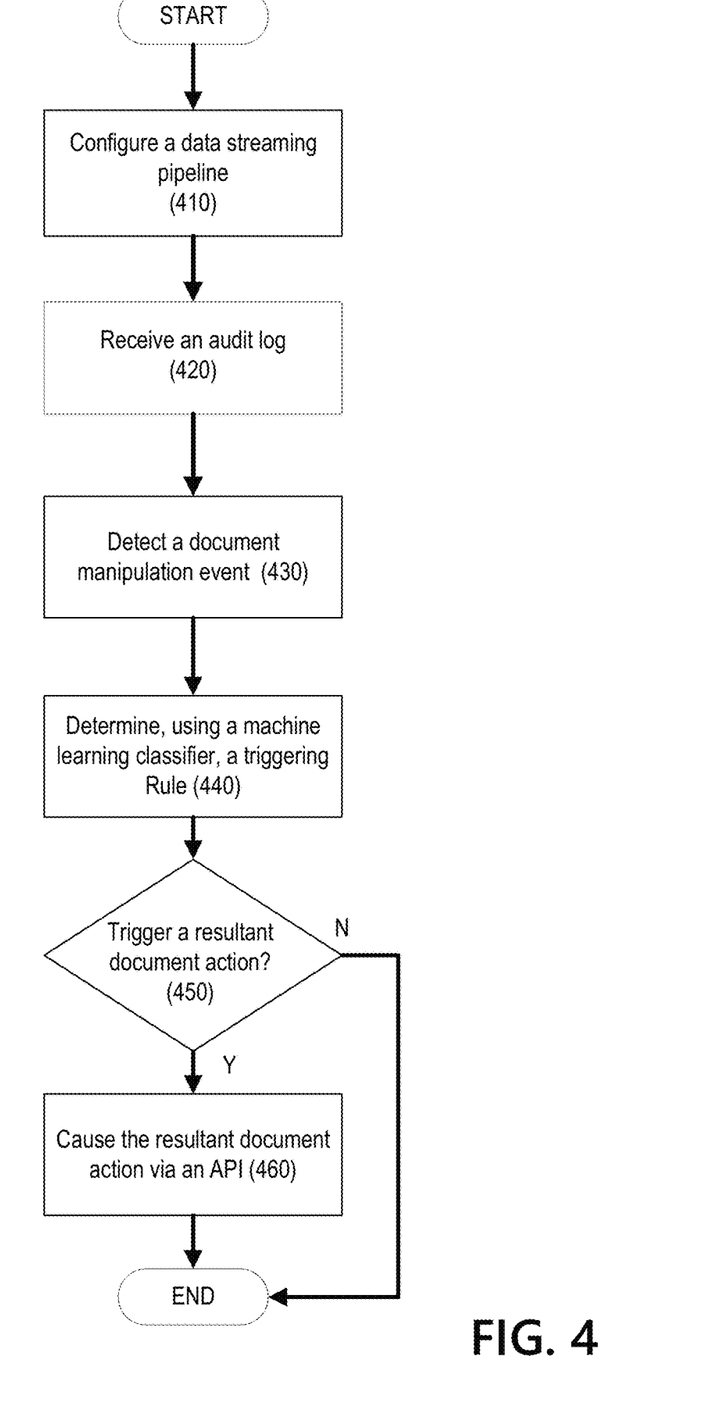
FIG. 4 depicts an illustrative process for implementing one or more aspects of the disclosure in accordance with one or more illustrative aspects discussed herein.

FIG. 4 depicts an illustrative process for implementing the enhancement of cloud workspace metadata and marking capabilities in accordance with one or more illustrative aspects discussed herein. At step 410, a metadata processing system (e.g., the metadata processing server 380) may configure a data streaming pipeline between a cloud document storage platform and a cloud platform. The cloud document storage platform may store documents, their metadata and corresponding audit logs. The cloud document storage platform may provide standard functionalities for an enterprise user to interact and manipulate the documents. The cloud document storage platform may be any type of known cloud storage platform including, but not limited to, Microsoft 365® (which includes cloud storage OneDrive®) and Google Workspace® (which includes cloud storage Google Drive®). The cloud platform may provide an environment to run custom codes, build storage resources and computing resources tailored for an organization. The cloud platform may include, for example, Amazon Web Services®, Microsoft Azure® and Google Cloud Platform® (GWS, which is different from Google Workspace). The metadata processing system may reside in an enterprise system independent from the cloud document storage platform and the cloud platform. The metadata processing system may also partially or fully reside on the cloud document storage platform or the cloud platform.

At step 420, the metadata processing system may receive an audit log associated with a document stored in the cloud document storage platform. The audit log generated by the cloud data storage platform may be received (intercepted) by the metadata processing system from a data stream of the audit logs. The cloud data storage platform may make the audit log available outside the cloud storage platform to software tools, such as API calls from an API for document manipulation events or a metadata processing API. The metadata processing system may use software tools or an API to stream the audit logs from their cloud data storage platform (e.g., GWS) using tools available from their cloud provider (e.g., AWS) or, alternatively, enterprise scripts for auditing by the API for document manipulation events.

The metadata processing system may receive audit log as unstructured data format, such as a string of characters in a text format. The string of characters may be converted into a common format, such as a JSON format or an XML format. The metadata processing system may receive and process the live audit log in a data stream on the fly. The metadata processing system may receive and process the audit log in batch manner. For example, the audit log may be received periodically, such as once per minute or once per 10 seconds.

At step 430, the metadata processing system may monitor the audit log and detect a document manipulation event associated with the document stored in the cloud document storage platform. The audit log may be streamed from the enterprise cloud provider such as AWS as described previously. The audit log received in the text format may be pre-processed, such as performing a random sampling to take chunks of text to look for similarities among different batches to eliminate duplicated data. The audit log may be generated after a verification of non-duplicated data to produce a light weight data payload. In some examples, the metadata processing system may use natural language processing (NLP) or optical character recognition (OCR) to parse the audit log identify the keywords such as "update," "change," "user classification label," "confidential," "document name," "download," "duplicate," and/or "print." The metadata processing system may remove certain stop words that do not add much meaning for the purpose of identifying the document manipulation event, such as "at", "the", "is", "which", etc.

The metadata processing system may detect whether one or more document manipulation events are present in the audit logs. A document manipulation event may include a change to a label, a document name or content for the document. The document manipulation event may include certain operations on the document, such as a download, a duplication, or a printing operation on the document.

In one example, a change of a label may include a change to a data classification label. An enterprise may have a spreadsheet (in Google Sheets) stored on a cloud document storage platform (e.g., Google Drive on GWS) with a list of customers that includes customer attributes like name, address, social security number, account number, etc. Due to the sensitivity of such information, the business may want to limit who can access the spreadsheet from Google Drive and what actions those that can access the spreadsheet are permitted to perform. This can be achieved by the document creator defining a data classification label as metadata for the document. A data classification label may be, for example, a sensitivity label, which may identify the permissions or sensitivity associated with the document and may have a value of, for example, "highly confidential", "confidential" or "not confidential". Many different tiers of access rights could be defined. When a user attempts to access, on the cloud data storage platform, the spreadsheet that has a data classification label of "highly confidential", a determination is made as to whether the user is authorized (e.g., has access rights) to access the document and what actions the user is permitted to perform. This scheme prevents unauthorized users from accessing "highly confidential" documents as well as prevents users who can access the document from performing actions that they do not have permission to perform. For example, a user who can access the "highly confidential" document may have view only permission while another user may not have permission to edit the document on the cloud storage platform, but may be able to download to their local computer or print the document. Given that a change of the data classification label on the document may have security ramifications, a corresponding log entry may be created in the audit log accordingly. The metadata processing system may recognize this event (e.g., the change of the data classification label) as a document manipulation events in the audit log.

At step 440, the metadata processing system may determine a triggering rule based on the document manipulation event using a machine learning model. The pre-processed audit log including the document manipulation event may be provided as input to the machine learning model. In some examples, log entries in the audit log that are relevant to the document manipulation events may be provided as input to the machine learning model. The metadata processing system may convert the pre-processed audit log from the first data format to a second data format, and the second data format may include text embeddings, or image embeddings that are generated based on the audit log. For example, the metadata processing system may use an autoencoder such as a variational autoencoder (VAE) to convert the audit log entries. An autoencoder may be a type of artificial neural network used to learn efficient data coding in an unsupervised manner. The autoencoder may learn a representation (e.g. encoding) for a set of data for the purpose of dimensionality reduction by training the network to ignore signal "noise". The autoencoder may have a reconstructing side, where it may generate, from the reduced encoding, a representation as close as possible to its original input. An embedding may be a compact representation of the original data. The metadata processing system may use language modeling and feature learning techniques in NLP where key words or phrases from the collection of the audit log entries may be mapped to vectors of real numbers. In one example, the audit log may contain three entries corresponding to three document manipulation events for three different documents. Based on the key words in the first entry, the metadata processing system may convert the first entry into a ten-dimensional vector of features, while maintaining the features of the original data sample. Likewise, the metadata processing system may convert the second entry into another vector of features.

In the example that the audit log contains various features of the document, the metadata processing system may process the audit log to generate a record including key words such as a document identifier, a document name, a document size, a document manipulation event, a timestamp of the document manipulation event, and so on. The metadata processing server may convert the record into text embeddings corresponding to a vector of features based on these key words. For example, the first record may include a first vector of features for a first document such as DocID1, "Document A," 400K, "data classification label modified", T1, and so on. The second record may include a second vector of features for a second document such as DocID2, "Document B," 500K, "content modified", T2, and so on. The third record may include a third vector of features for a third document such as DocID3, "Document C," 600K, "downloading", T3, and so on.

The metadata processing server 380 may train the machine learning model to determine pre-labeled triggering rules based on training data including document metadata such as document names, document creation times, last modified times, document types, prelabeled document manipulation events. The training data may also include user data related to the document manipulation events, such as locations of user having been trained, IP addresses of the users; roles of the users in an organization, and department affiliations of the users in the organization. The training data may be stored and retrieved from a training database. The training data may be collected from previous user interactions with the documents in a workspace, where the document manipulation events were captured and recorded in a training audit log. The training data may include text embeddings from the training audit log. The training data may include pre-labeled document manipulation events that result in resultant document actions. The training data may also include pre-labeled document manipulation events that do not result in any resultant document actions. The pre-labeled trigger rules may reflect the mapping between the pre-labeled document manipulation events and the pre-labeled resultant document actions.

During the model training process, the weights of each connection and/or node may be adjusted as the model adapts to generate more accurate predictions on a training data set. The weights assigned to each connection and/or node may be referred to as the model parameters. For example, the metadata processing server may use a deep learning model and the model may be initialized with a first set of model parameters. The machine learning model may use the training data as input based on the first set of model parameter and determine product similarities with a first confidence level. The metadata processing server may generate a second set of model parameters based on the adjustment on the first set of model parameters. The machine learning model may use the training data as input based on the second set of model parameter and determine product similarities with a second confidence level. Based on a comparison between the first confidence level and the second confidence level, metadata processing server 380 may determine a more optimal set of parameters between the first set of model parameters and the second set of model parameters. The metadata processing server 380 may go through several iterations, and the machine learning model may be tuned with a set of optimal model parameters when the confidence level reaches a predetermined threshold (e.g., 95%).

The metadata processing server 380 may use the tuned or trained machine learning model to determine the triggering rule corresponding to the document manipulation event. Based on the input such as log entries in the audit log that are relevant to the document manipulation event, the metadata processing server may receive as output from the trained machine learning model, the determined one or more triggering rules. For example, the machine learning model may output that a first trigger rule for the first record "DocID1, 'Document A,' 400K, 'data classification label modified', T1." The first triggering rule may stipulate that the data classification label modification in the first record triggers an update to a security classification label. The machine learning model may output a second triggering rule for the second record "DocID2, 'Document B,' 500K, 'content modified', T2." The second triggering rule may stipulate that the content modification in Document B is deemed to be minor and such modification triggers no resultant document action. The machine learning model may output a third triggering rule for the third record "DocID3, 'Document C,' 600K, 'downloading', T3." The third triggering rule may stipulate that downloading Document C triggers a generation of an indicator "downloaded at T3 by user A" to be applied to Document C.

In some examples, the machine learning model may determine different triggering rules on the documents depending on different users performing the document manipulation events. For example, an attorney in the legal department sharing a document with an executive in the organization may trigger the label on the document to be changed to "confidential." On the other hand, an engineer sharing a technical document with another engineer may not trigger such label change.

In some example, the metadata processing server may receive user feedback information indicating whether the triggering rule is valid. The metadata processing server may re-train the machine learning model based on the user feedback information. For example, the user may be presented on a user interface with a message that "your change to document B at time T2 has not resulted in any change to the confidential classification, please confirm." The user may have the options to either confirm or reject this message. If the triggering rule is updated based on the user's feedback, the record related to document C and the new triggering rule may be labeled and used as training data to retain the machine learning model.

At step 450, the metadata processing system may determine whether the document manipulation event triggers a resultant document action based on the triggering rule. The metadata processing server may determine the resultant document action based on the triggering rule determined using the machine learning model. In some examples, the metadata processing server 380 may store a number of triggering rules associated with a particular document in the cloud document storage platform with the document. Once a document manipulation event is detected, the metadata processing system may retrieve the triggering rules from the cloud document storage platform using the document identifier, and may determine whether a resultant document action is triggered. If the metadata processing system determines that the document manipulation event does not trigger a resultant document action, the process ends. Otherwise, the process proceeds to step 460.

Figure 5A:
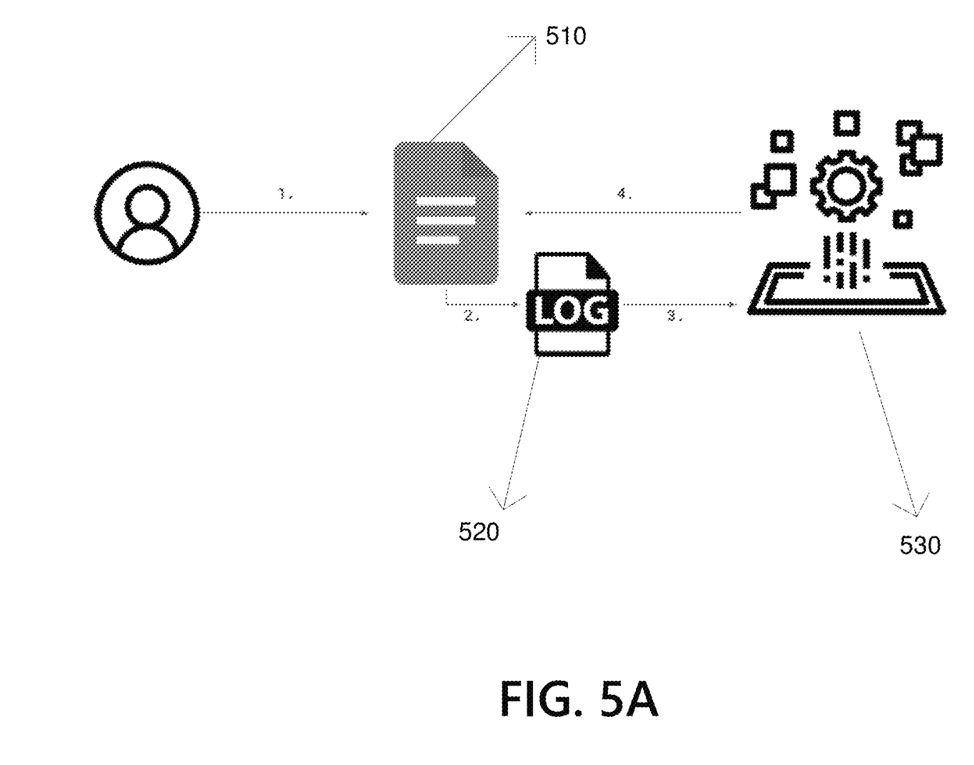
FIG. 5A depicts an example of the metadata processing system processing the audit log in accordance with one or more illustrative aspects discussed herein.

FIG. 5A depicts an example of the metadata processing system processing the audit log in accordance with one or more illustrative aspects discussed herein. At step 1, a user interacts with a document 510 (e.g., Google document) in a cloud document storage platform (e.g., Google Drive). The interaction may include editing content of the document, modify a label of the document, change the name of the document, or other operations such as downloading, duplicating or printing the document. At step 2, the interaction may generate an audit log 520, which is stored in the cloud document storage platform. The interaction may be captured as a document manipulation event. At step 3, the metadata processing server 530 may receive the audit log 520 via a data streaming pipeline. At step 4, the metadata processing server 530 may process the audit log 520 and determine a triggering rule corresponding to the document manipulation event. The metadata processing server 530 may use a machine learning model to determine the triggering rule. The metadata processing server 530 may use a dictionary mapping certain document manipulation events to resultant document actions. Such dictionary may contain the triggering rules predefined by the enterprise to meet its data security and compliance needs. The dictionary may be stored with the documents in the cloud document storage platform. However, it may be tedious and counter-productive to define the triggering rules for each document in the enterprise document repository. The machine learning model may be used to infer triggering rules from similar document manipulation events, on similar types of documents or performed by similar enterprise users. The machine learning model might be particularly useful in the scenario that a new document is created and the trigger rules might not be defined for the document. The machine learning model may identify the hidden logics and document metadata to maintain consistent data security and integrity at the enterprise level. The metadata processing server 530 may instantly respond to the user interaction with the document by causing numerous resultant actions to the document to suit technical, security, business or compliance needs of the enterprise. The resultant document actions might not be possible natively in the enterprise workspace environment and may be implemented without the specific knowledge of the individual user.

At step 460, the metadata processing system may cause the resultant document action via one or more APIs. For example, the metadata processing server 380 may change a security label on the document to "highly confidential" and apply such change to the document via the metadata processing API or API for document manipulation events. Accordingly, the new security label may be stored with the document in the cloud object storage on the cloud document storage platform.

Figure 5B:
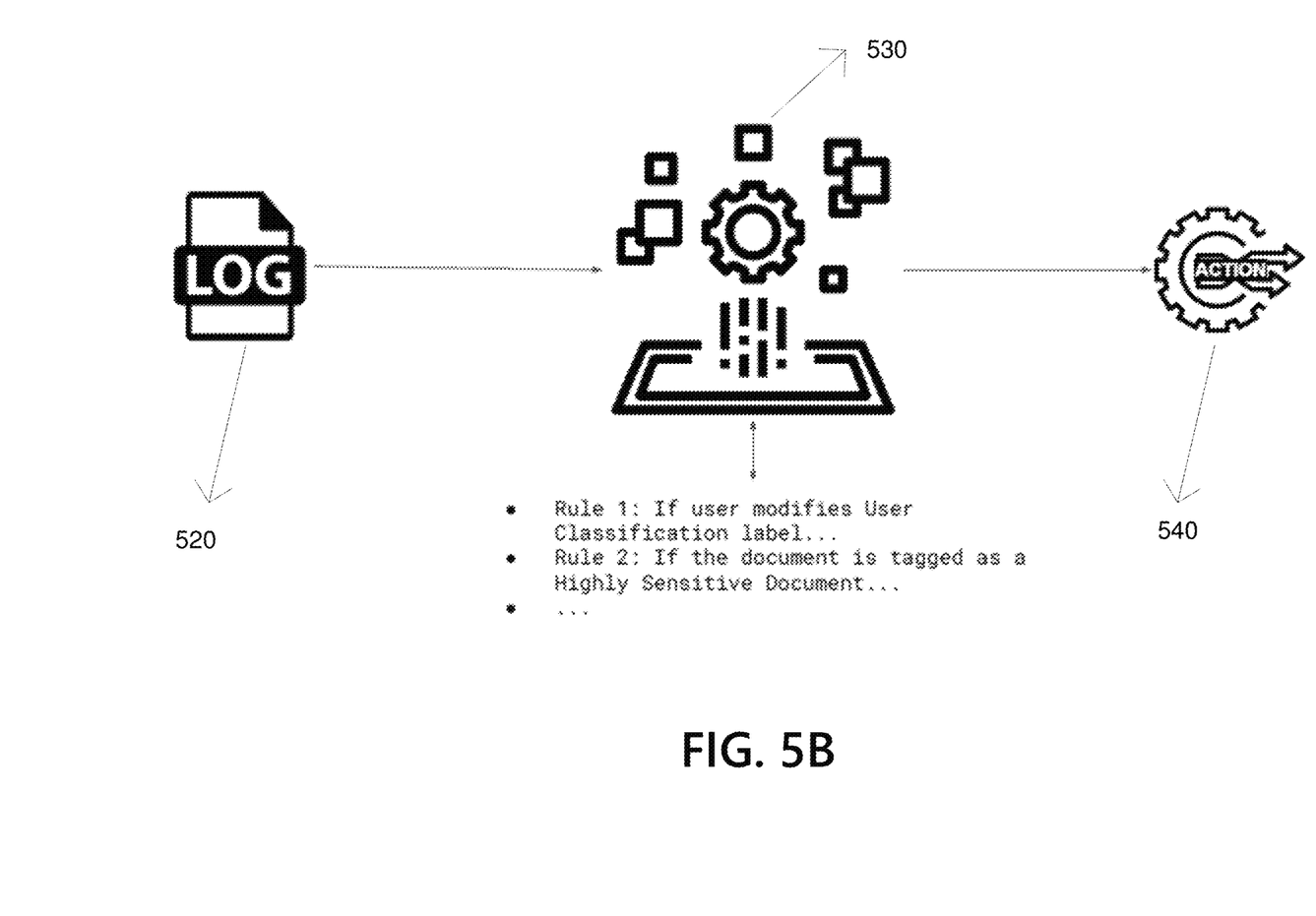
FIG. 5B depicts an example of the metadata processing system triggering the resultant document actions in accordance with another illustrative aspect discussed herein.

FIG. 5B depicts an example of a metadata processing system triggering resultant document actions in accordance with one or more illustrative aspects discussed herein. The metadata processing server 530 may receive the audit log 520 and extract the keywords related to the document manipulation event. In some examples, the metadata processing server 530 may extract, from the audit log 520, log entries by using natural language processing (NLP) to parse the log entries to identify key words associated with one or more document manipulation events. The metadata processing server 530 may use a second machine learning model to determine the document manipulation event based on the key words. The second machine learning model may be the same or different from the machine learning model used to determine the triggering rules. The metadata processing server 530 may compare the document manipulation event against the document triggering rules and logics at the enterprise level. If the applicable triggering rule warrants an action, the metadata processing server 530 may trigger a resultant document action 540 in response. If the document manipulation event does not correspond to any trigger rules, or the triggering rule does not warrant an action, the metadata processing server 530 might not cause a resultant document action 540. The metadata processing server 530 may continue to monitor the audit log 520 for the next document manipulation event.

Figure 6:
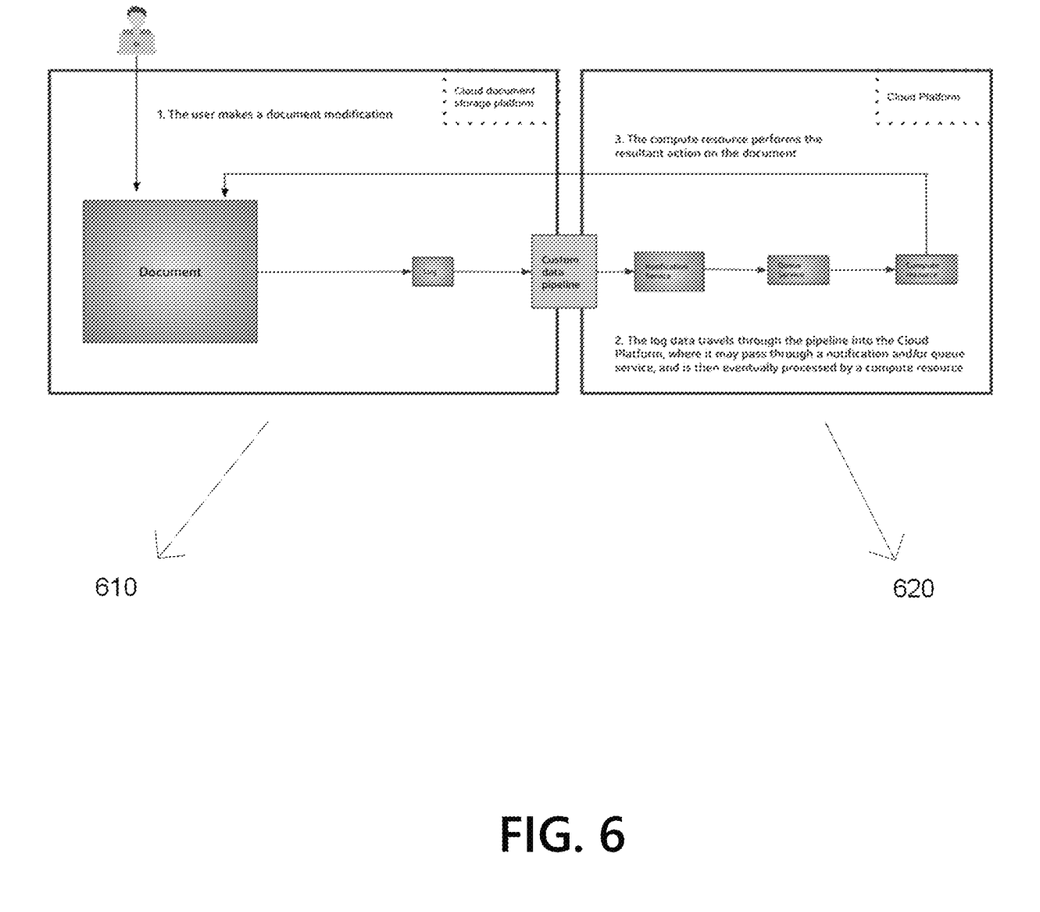
FIG. 6 depicts an example user interface for enhancement in metadata processing and marking capability in accordance with another illustrative aspect discussed herein.

FIG. 6 depicts an example user interface for enhancement in metadata processing and marking capability in accordance with another illustrative aspect discussed herein. FIG. 6 shows an example user interface in a cloud document storage platform 610 (e.g., Google Workspace) that the user may perform a document manipulation (e.g., change the document classification). A metadata processing server may implement a custom data pipeline between the cloud document storage platform 610 and a cloud platform 620 (e.g., an AWS environment). The user's operation may be recorded in the audit log. The metadata processing server may implement a first collection of background processes and services, and a second collection of background processes and services to support the data streaming of the audit log across the cloud document storage platform 610 and a cloud platform 620 in real time. The first collection may include the processes and services for the custom data pipeline and the notification service (e.g. AWS SNS), and the second collection may include the processes and service for the queue service (e.g., AWS SQS) and compute resource (e.g., AWS Lambda). The metadata processing server may receive the audit log via the custom data pipeline in real time and capture the user's operation as a document manipulation event. Once the compute resource detects a change in the audit log, the data (audit log) may be pushed to a load balancer. The load balancer may send the data to a compute resource, which is a log receiver. The log receiver may forward the data to a notification services (e.g., AWS SNS), which pushes the data to a custom queue service (e.g., AWS SQS (simple queue service)) message queue. From the custom queue service, the message including the data (audit log) may be sent to a compute resource and a streaming function, which streams the data over a stream-processing platform (e.g., Apache Kafka™ streams API) to an enterprise long term data store (e.g., enterprise data lake). As such, the cloud document storage platform audit log data travels through the custom data pipeline into the cloud platform, and the compute resource processes the audit log data. The metadata processing server may determine a triggering rule corresponding to the document manipulation action and cause a resultant document action. For example, using the compute resource, the metadata processing server may performs the resultant document action.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
configuring, by a computing device, a data streaming pipeline between a cloud document storage platform and a cloud platform;
receiving, by the computing device, an audit log associated with a document stored in the cloud document storage platform;
detecting, based on monitoring the audit log, a document manipulation event comprising changing a data classification label in the cloud document storage platform, wherein the data classification label defines user access rights to the document in the cloud document storage platform;
determining, by the computing device, based on the document manipulation event and using a machine learning model, a triggering rule associated with the document;
based on the triggering rule, determining whether the document manipulation event triggers a resultant document action comprising changing a security classification label in the cloud platform, wherein the security classification label defines user operations in the cloud platform, and the data classification label is associated with functionalities in the cloud document storage platform, which are not available in the cloud platform; and
after determining that the document manipulation event triggers the resultant document action, causing, via an Application Programming Interface (API), the resultant document action in the cloud platform.

2. The method of claim 1, wherein determining the triggering rule comprises:
determining, by the computing device, a rule identifier associated with the document manipulation event; and
retrieving, by the computing device, based on the rule identifier and from the cloud document storage platform, the triggering rule associated with the document manipulation event.

3. The method of claim 1, further comprising:
training the machine learning model to determine prelabeled triggering rules based on training data comprising: document names, document creation times, last modified times, document types, and prelabeled document manipulation events;
providing, as an input to the trained machine learning model, a plurality of document manipulation events comprising the document manipulation event and metadata information associated with the document; and
receiving, based on an output from the trained machine learning model, a plurality of triggering rules associated with the document, wherein the plurality of triggering rules comprise that the document manipulation event results in the resultant document action, and that a second document manipulation event does not result in any resultant document action.

4. The method of claim 3, wherein the training data further comprises:
locations of users having been trained;
IP addresses of the users;
roles of the users in an organization; and
department affiliations of the users in the organization.

5. The method of claim 3, further comprising:
receiving user feedback information indicating whether the triggering rule is valid; and
re-training the machine learning model based on the user feedback information.

6. The method of claim 1, wherein the document manipulation event comprises a change to one or more labels or metadata on the document stored in the cloud document storage platform.

7. The method of claim 1, wherein the document manipulation event comprises a change to content of the document stored in the cloud document storage platform.

8. The method of claim 1, wherein the document manipulation event comprises a change to a title of the document stored in the cloud document storage platform.

9. The method of claim 1, wherein the document manipulation event comprises a download of the document from the cloud document storage platform.

10. The method of claim 1, wherein the document manipulation event comprises a duplication of the document stored in the cloud document storage platform.

11. The method of claim 1, wherein the document manipulation event comprises a printing of the document stored in the cloud document storage platform.

12. The method of claim 1, wherein detecting, based on monitoring the audit log, the document manipulation event comprises:
    extracting, from the audit log, log entries by using natural language processing (NLP) to parse the log entries to identify key words associated with one or more document manipulation event; and
    using a second machine learning model to identify the document manipulation event based on the key words.

13. An apparatus, comprising:
    one or more processors; and
    memory storing instructions that, when executed by the one or more processors, cause the apparatus to:
        configure a data streaming pipeline between a cloud document storage platform and a cloud platform;
        receive an audit log associated with a document hosted in the cloud document storage platform;
        detect, based on monitoring the audit log, a document manipulation event comprising changing a data classification label in the cloud document storage platform, wherein the data classification label defines user access rights to the document in the cloud document storage platform;
        determine, based on the document manipulation event and using a machine learning model, a triggering rule associated with the document;
        based on the triggering rule, determining whether the document manipulation event triggers a resultant document action comprising changing a security classification label in the cloud platform, wherein the security classification label defines user operations in the cloud platform, and the data classification label is associated with functionalities in the cloud document storage platform, which are not available in the cloud platform; and
        after determining that the document manipulation event triggers the resultant document action, causing, via an Application Programming Interface (API), the resultant document action in the cloud platform.

14. The apparatus of claim 13, wherein the instructions, when executed by the one or more processors, further cause the apparatus to determine the triggering rule by:
    determining, from the cloud document storage platform, a rule identifier associated with the document; and
    retrieving, based on the rule identifier, the triggering rule associated with the document.

15. The apparatus of claim 13, wherein the instructions, when executed by the one or more processors, further cause the apparatus to:
    train the machine learning model to determine pre-labeled triggering rules based on training data comprising: document names, document creation times, last modified times, document types, and other document metadata;
    providing, as input to the trained machine learning model, a plurality of document manipulation events comprising the document manipulation event and metadata information associated with the document; and
    receiving, based on output from the trained machine learning model, a plurality of triggering rules associated with the document, wherein the plurality of triggering rules comprise that the document manipulation event results in the resultant document action, and that a second document manipulation event does not result in any resultant document action.

16. The apparatus of claim 15, wherein the training data further comprises:
    locations of users having been trained;
    IP addresses of the users;
    roles of the users in an organization; and
    department affiliations of the users in the organization.

17. The apparatus of claim 15, wherein the instructions, when executed by the one or more processors, further cause the apparatus to:
    receive user feedback information indicating whether the triggering rule is valid; and
    re-train the machine learning model based on the user feedback information.

18. The apparatus of claim 13, wherein the instructions, when executed by the one or more processors, further cause the apparatus to detect the document manipulation event by causing the apparatus to:
    extract, from the audit log, log entries by using natural language processing (NLP) to parse the log entries to identify key words associated with one or more triggering rule; and
    use a second machine learning model to identify the document manipulation event based on the key words.

19. One or more non-transitory computer readable media storing instructions that, when executed by one or more processors, cause the one or more processors to perform steps comprising:
    configuring a real-time data streaming pipeline between a cloud document storage platform and a cloud platform;
    receiving an audit log associated with a document hosted in the cloud document storage platform;
    detecting, based on monitoring the audit log, a document manipulation event comprising changing a data classification label in the cloud document storage platform, wherein the data classification label defines user access rights to the document in the cloud document storage platform;
    determining, based on the document manipulation event and using a machine learning model, a triggering rule associated with the document;
    based on the triggering rule, determining whether the document manipulation event triggers a resultant document action comprising changing a security classification label in the cloud platform, wherein the security classification label defines user operations in the cloud platform, and the data classification label is associated with functionalities in the cloud document storage platform, which are not available in the cloud platform; and
    after determining that the document manipulation event triggers the resultant document action, causing, via an Application Programming Interface (API), the resultant document action in the cloud platform.

20. The one or more non-transitory computer readable media according to claim 19, wherein the instructions, when executed, further cause the one or more processors to determine the triggering rule by:
    training the machine learning model to determine pre-labeled triggering rules based on training data comprising: document names, document creation times, last modified times, document types, and other document metadata;
    providing, as input to the trained machine learning model, a plurality of document manipulation events comprising the document manipulation event and metadata information associated with the document; and
    receiving, based on output from the trained machine learning model, a plurality of triggering rules associated with the document, wherein the plurality of triggering rules comprise that the document manipulation event results in the resultant document action, and that a second document manipulation event does not result in any resultant document action.

\* \* \* \* \*